United States Patent [19]

Mar

[11] 3,786,443

[45] Jan. 15, 1974

[54] NONDESTRUCTIVE READ SEMICONDUCTOR MEMORY UTILIZING AVALANCHE BREAKDOWN

[75] Inventor: Jerry Mar, Scotch Plains, N.J.

[73] Assignee: Bell Telephone Laboratories, Incorporated, Murray Hill, N.J.

[22] Filed: July 10, 1972

[21] Appl. No.: 270,504

[52] U.S. Cl. ............ 340/173 R, 307/238, 307/283, 307/320

[51] Int. Cl. ...................... G11c 11/36, G11c 11/40

[58] Field of Search ................ 340/173 CA, 173 R; 307/238, 280, 283, 300, 302, 317, 320

[56] References Cited

UNITED STATES PATENTS

| | | | |
|---|---|---|---|
| 3,699,540 | 10/1972 | Lynes | 340/173 R |
| 3,693,173 | 9/1972 | Heightley | 340/173 R |
| 3,699,541 | 10/1972 | Lynes et al. | 340/173 R |
| 3,699,542 | 10/1972 | Lynes and Mar | 340/173 R |

OTHER PUBLICATIONS

Bipolar Memory Cells Strike Back in War with MOS, Electronics, March 1, 1971, p. 19

*Primary Examiner*—Bernard Konick
*Assistant Examiner*—Stuart Hecker
*Attorney*—I. Ostroff

[57] ABSTRACT

A semiconductor memory system contains an array of two-terminal memory cells which each comprise a single junction transistor having an uncontacted base. Bit information is written into a selected cell by applying appropriate voltage waveforms to the collector and emitter of the transistor to set the potential of the base to values which represent, respectively, either a "1" and a "0". Readout is accomplished by applying a voltage waveform containing a positive and a negative pulse to the collector of the transistor so as to first cause a change in the base potential and a corresponding change in the emitter potential, which is indicative of the information stored in the transistor cell, and then to cause the stored information to be rewritten into the cell. The readout operation is nondestructive and additionally refreshes stored information.

9 Claims, 7 Drawing Figures

NONDESTRUCTIVE READ SEMICONDUCTOR MEMORY UTILIZING AVALANCHE BREAKDOWN

BACKGROUND OF THE INVENTION

1. Field of the Invention

This invention relates to memory apparatus which utilizes semiconductor memory cells operated in a dynamic manner, as components in large capacity memories.

2. Description of the Prior Art

In computers and related applications there exists a need for large capacity semiconductor memories in which information can be temporarily stored and read out within a useful period of time. To meet such requirements, it is necessary that the basic memory cell be of a sufficiently simple structure to permit a relatively large number to be fabricated and interconnected on a single monolithic integrated circuit chip.

In the publication *Electronics* of Mar. 1, 1971, an article entitled "Bipolar Memory Cells Strike Back in War with MOS" on page 19, and U.S. Pat. No. 3,699,541 issued Oct. 17, 1972, in which the present applicant is a co-inventor and in which there is a common assignee, a large capacity memory array, comprising a plurality of interconnected two-terminal memory cells each comprising a single transistor, is described. Information is stored in the cell by setting the potential of the uncontacted base to one of two values, which represent, respectively, a stored "1" and a "0". Information once stored into the cell will remain for a period of time which is determined by the leakage of current from the base into the relatively high impedances of reverse-biased semiconductor junctions. This leakage requires that information be periodically rewritten into the cells (refreshed). Unfortunately, however, the circuit is designed such that, before the information can be refreshed, it is necesssary to read out and detect the information stored in the cell.

The readout operation of the above described cell is destructive in that it leaves a "0" written into the cell, independent of what information was previously stored therein. If the information is to be retained, it is, therefore, necessary to know what information was stored in the cell prior to readout in order to be able to rewrite and thereby preserve the information.

It would be desirable to have a semiconductor memory array comprising dynamically operated memory cells having many of the desirable characteristics of the above described cell but in which the readout operation were nondestructive and, in addition, refreshes the stored information. It would also be desirable to be able to refresh information stored in a cell without having to read out and detect the information stored therein.

OBJECTS OF THE INVENTION

It is an object of this invention to attain many of the desirable characteristics of the previously described memory array of which this array is an improvement.

It is a further object of this invention to provide a semiconductor memory array comprising memory cells operated in a dynamic fashion in which the readout of information from a cell does not destroy the information stored in that cell and, additionally, refreshes the information.

It is still a further object of this invention to provide a semiconductor memory array in which refresh can occur without the necessity of first having to read out and detect information.

SUMMARY OF THE INVENTION

These and other objects of the invention are attained in a semiconductor memory array comprising a plurality of interconnected memory cells each of which comprise a single junction transistor the base of which is uncontacted. The emitters of all the transistors in a common column, which is to be described as a word line, are coupled to word line control circuitry. The collectors of all transistors in a common row, which is to be described as a digit line, are connected to digit line control circuitry and to detection circuitry. In addition, a separate capacitance is coupled to each digit line.

A "0" is written into a selected cell by applying a voltage waveform comprising a positive polarity and a negative polarity pulse to the collector of the selected transistor while holding the emitter potential relatively constant in order to set the potential of the base to a first value which is defined as a "0".

A "1" is written into the selected cell by applying the same voltage waveform to the collector of the selected transistor but instead of holding the emitter potential constant, it is positively pulsed concurrently with the negative pulse of the collector waveform. The combination of these pulses causes the base potential to be set to a second value which is defined as a "1".

Readout is accomplished by applying the same waveform used for the write operations to the collector of the selected transistor, but allowing the emitter potential to float during the duration of the applied collector waveform and then adjusting the emitter potential to a reference potential. This operation causes information stored within the cell to be nondestructively read out and, in addition, to be refreshed. A purely refresh operation is accomplished by performing a readout operation but not detecting the stored information.

These and other objects, features and advantages of this invention will be better understood from a consideration of the following detailed description taken in conjunction with the accompanying drawings.

DETAILED DESCRIPTION

Figure 1:
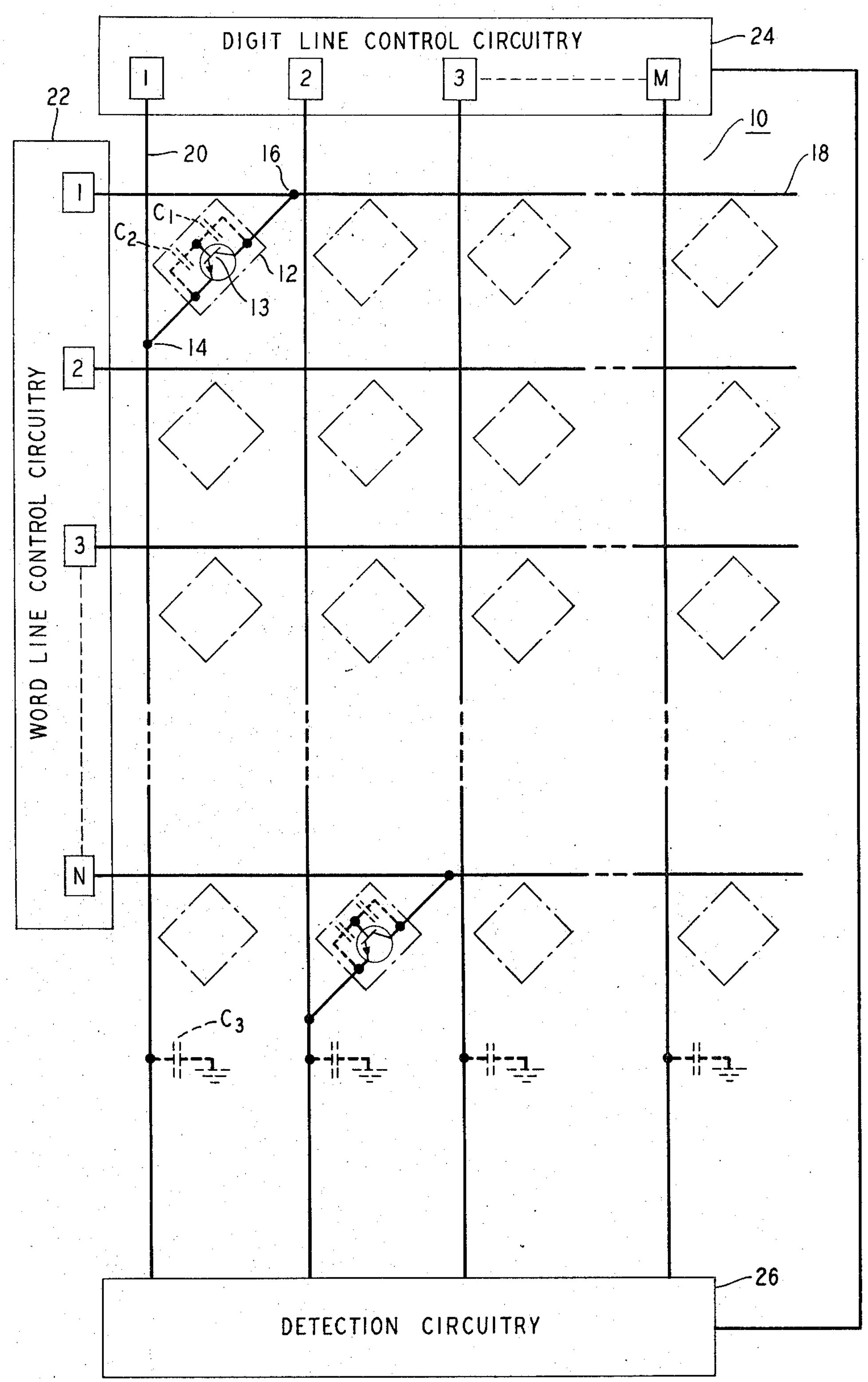
FIG. 1 illustrates in block circuit form a memory system in accordance with the invention.

Referring now to FIG. 1, there are illustrated the basic elements of a bit organized memory system 10 in accordance with this invention. A plurality of individual memory cells 12 are arranged in a two-dimensional array of M rows and N columns to form a memory having MxN memory cells. Each of the memory cells 12 has two terminals 14 and 16 and is capable of storing bit information for a useful period of time. Terminal 14 is connected to a digit line 20 and terminal 16 is connected to a word line 18. All of the word lines 18 are connected to word line control circuitry 22; all of the digit lines 20 are connected to digit line control circuitry 24 and detection circuitry 26. A separate capacitance $C_3$ is connected to each digit line 20.

Each memory cell 12 comprises a single junction transistor 13 having an uncontacted base. Capacitance $C_1$ couples the collector of transistor 13 to the base and as shown by the dashed lines capacitance $C_2$ couples the emitter to the base, capacitances $C_1$ and $C_2$ are the base-collector and emitter-base parasitic capacitances associated with the junction transistor 13. Capacitance $C_3$ may be a discrete component or may consist entirely of the parasitic capacitance associated with the emitters of transistors 13 coupled to a single digit line and the parasitic capacitance of the digit line itself.

The word line control circuit 22 and the digit line control circuit 24 are designed to provide the waveforms shown in FIGS. 2A, 2B, 3A and 3C. As will appear below, these waveforms consist simply of positive and negative pulses of appropriate amplitude and timing, and accordingly can be provided by a wide variety of circuitry obvious to a worker in the art, such as a combination of pulse generators each providing a pulse train; the pulse trains being appropriately timed for combination to provide a desired waveform.

Figure 2A:
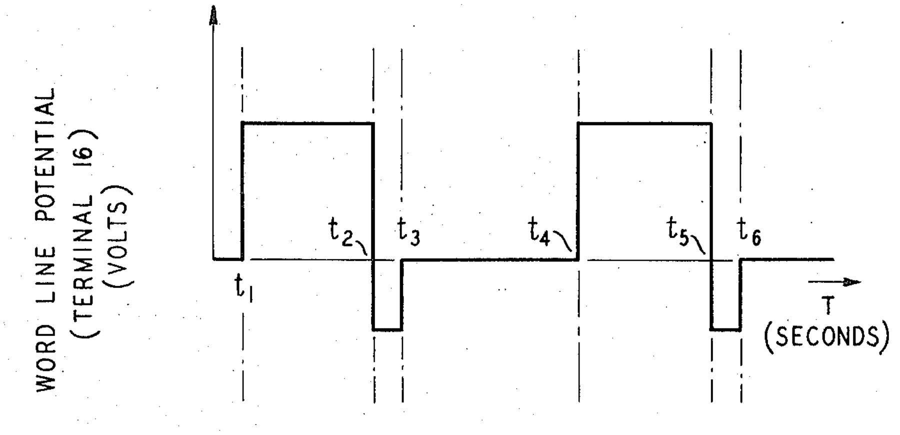
FIGS. 2A and 2B illustrate the waveforms applied to a word line and digit line respectively, of the memory system of FIG. 1, as functions of time, to write information into a selected cell of the array.
Figure 2B:
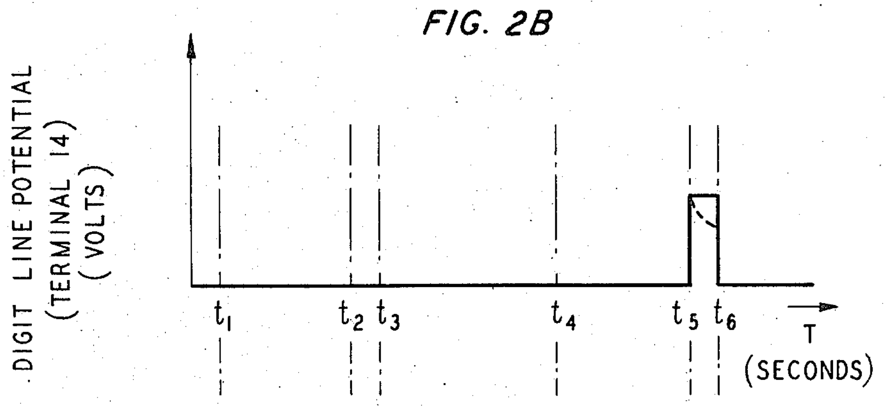
Figure 2C:
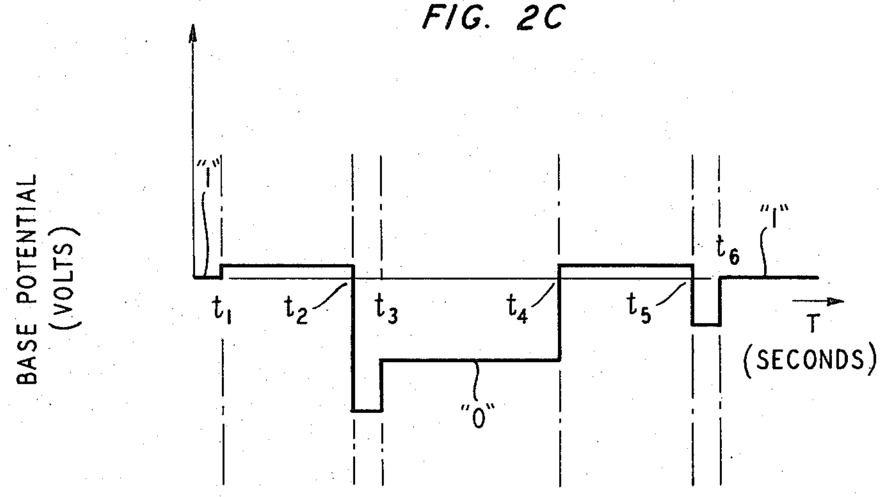
FIG. 2C illustrates the corresponding waveform appearing on the base of the selected transistor of the array as a function of time.

The typical operation of the memory array of FIG. 1 can be easily seen from the voltage versus time graphs of FIGS. 2A–2C and 3A–3C. FIGS. 2A and 2B illustrate the potentials applied to terminals 16 and 14 of a preselected memory cell 12 by the word line control circuitry 22 through word line 18 and the digit line control circuitry 24 through digit line 20, respectively, as a function of time. These waveforms are utilized to write information into a selected cell. FIG. 2C illustrates the corresponding potential of the base of the selected transistor 13 as a function of time.

Referring now to FIGS. 2A and 2B, there is illustrated the voltage waveforms applied to terminals 16 and 14, respectively, of a selected memory cell 13, to first write a "0" into a cell containing a "1" and then to write a "1" into the cell containing a "0". FIG. 2C illustrates the corresponding potential of the base as a function of time. It is assumed that at $T = t_{1-}$ the potential of the base is at a value which is defined as a "1" and that the word line and digit line potentials are at the reference level, which is typically ground potential.

Between $T = t_1$ and $t_3$ the potential of the digit line is held at the reference potential and the word line is first positively pulsed and then negatively pulsed. The amplitude of the positive pulse is typically +6 volts and that of the negative pulse is −3.1 volts. This sequence of applied waveforms first causes the base potential of the selected transistor to rise with respect to the emitter potential such that the emitter base junction is forward-biased and transistor conduction occurs at $T = t_{1+}$.

At $T = t_2$ the base potential decreases with respect to the emitter potential in response to the drop in the word line potential until the emitter base junction limits any further decrease in base potential by momentarily acting in avalanche breakdown. Typically the potential of the base between $T = t_{2+}$ and $t_{3-}$ is −5.9 volts. The base potential then increases in response to the increase in the word line potential at $T = t_{3+}$ to a level which is defined as a "0" level.

In order to write a "1" into the cell which now stores a "0", the same voltage waveform used to write a "0" is again applied to the word line (between $T = t_4$ and $t_6$), but during the negative portion of this waveform ($T = t_5$ to $t_6$), the digit line potential is positively pulsed.

The initial reaction of the base potential to the increase in the word line potential occurring at $T = t_4$, is to increase with respect to the emitter potential so as to forward-bias the emitter base junction and thereby allow transistor conduction. At $T = t_5$ the base potential is reduced as a result of the net effects of the negative portion of the word line voltage pulse and the positive digit line voltage pulse, such that it is set to a level which is more positive than the "0" level. Typically the level is −2.5 volts. This level is the result of the emitter base junction operating at or near avalanche breakdown, while the collector-base junction is either forward-biased or almost forward-biased. The termination of the word line and digit line voltage pulses (at $T = t_6$) causes the potential of the base to return to a level defined as a "1".

It is not necessary to the write "1" operation that the digit line potential be held at a value more positive than the reference potential during the entire period between $T = t_5$ and $t_6$. The embodiment of the digit line control circuitry 24 comprising a voltage pulse generator circuit and M diodes can be used to set the potential of a selected digit line at $T = t_5$. During the time from $T = t_5$ to $t_6$ the digit line potential will decay due to the avalanche breakdown operation of the emitter base junction. (See the dashed line of FIG. 2B.) At $T = t_6$ the digit line potential is lowered to the reference potential and held there.

Typically the "1" level is 0 volts and the "0" level is −3.6 volts. The emitter-base junction breakdown potential is typically 6 volts. The amplitude of the digit line voltage pulse is typically +3.5 volts. The time period from $T = t_1$ to $t_2$ and $t_4$ to $t_5$ is typically 10 nanoseconds; the time period from $T = t_2$ to $t_3$ and $t_5$ to $t_6$ is typically 2 nanoseconds.

Figure 3A:
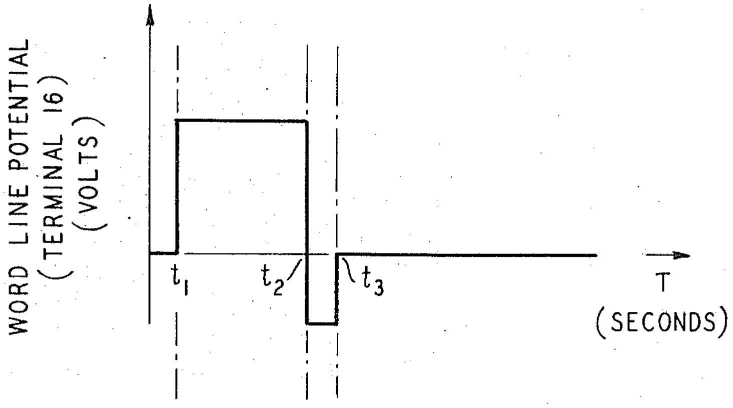
FIG. 3A illustrates the waveform applied to a word line as a function of time to cause the readout of information from a selected memory cell and to refresh the information.
Figure 3B:
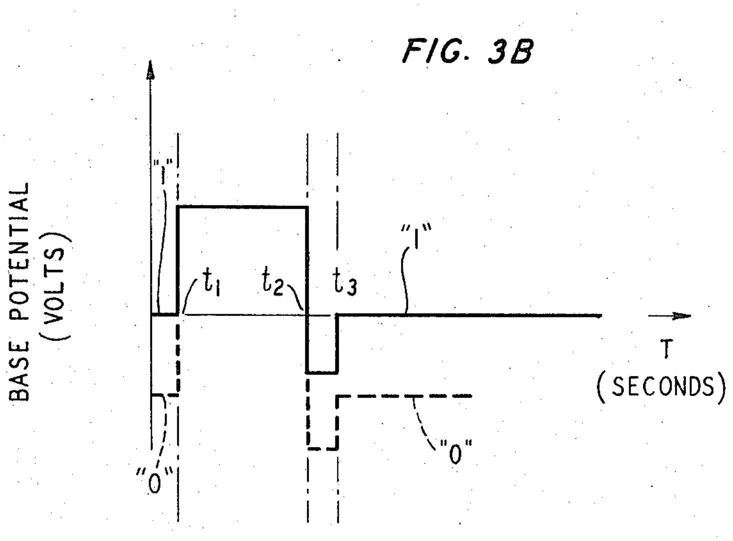
FIGS. 3B and 3C illustrate the respective waveforms, as functions of time, of the base and digit line (emitter of the selected transistor).
Figure 3C:
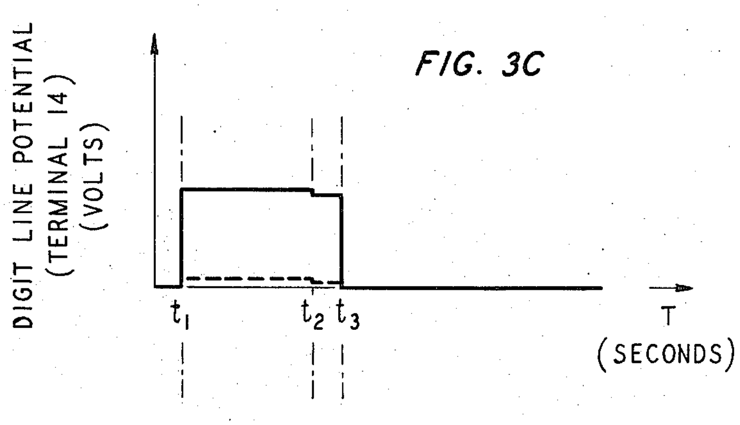

Referring now to FIG. 3A there is illustrated the voltage waveform applied to word line 18 as a function of time in order to cause the readout of information stored in a selected cell and to rewrite (refresh) the information in the selected cell and all other cells coupled to the common word line of the selected cell. FIG. 3B illustrates the potential of the base of the selected transistor as a function of time. FIG. 3C illustrates the potential of the digit line corresponding to the selected cell as a function of time.

In order to read out information stored in a selected cell, the same voltage waveform utilized to write information into a cell is applied between $T = t_1$ and $t_3$ to the word line 18 corresponding to the selected cell. The digit line potential, which is held at the reference potential prior to $T = t_1$, is allowed to float and to assume a potential corresponding to changes in the word line and base potentials. At $t = t_{1-}$ the selected transistor may contain a stored "1" or "0". The dashed line graph of FIG. 3B illustrates the situation in which the cell stores a "0" and the solid line graph indicates a situation in which the cell stores a "1".

The positive edge of the read voltage waveform of FIG. 3A, occurring at $T = t_1$, causes the base potential and the digit line potential to increase. If the cell stores a "1", the base potential rapidly increases to a positive value (typically +0.7 volt) with respect to the emitter potential (digit line potential), thereby forward-biasing the emitter-base junction which then serves as a voltage clamp such that the emitter (digit line) and base potential then both rise by approximately the same amount. Typically at $T = t_{1+}$ the base potential reaches approximately +4.8 volts and the emitter potential reaches approximately +4.3 volts.

If the cell stores a "0", the base potential increases rapidly to a positive value (typically +.7 volt) with respect to the emitter (digit line) potential, thereby forward-biasing the emitter-base junction, which then acts as a voltage clamp such that the emitter (digit line) and base then both rise in potential by approximately the same amount. Typically, at $T = t_{1+}$ the base potential reaches +0.9 volt and the emitter (digit line) potential reaches +0.2 volt.

The detection of information stored in the cell is accomplished by detecting the potential of the digit line corresponding to the selected cell during the time $T = t_{1+}$ to $t_{2-}$. The detection circuitry comprises a voltage measuring device that is switched to the digit line corresponding to the selected cell during the readout operation. The digit line control circuitry 24 is coupled to the detection circuitry 26 such that the voltage detector of the detection circuitry 26 may be switched to the proper digit line at any desired time. A reading of the potential of the digit line corresponding to the selected cell is made during the time from $T = t_{1+}$ to $t_{2-}$. Typically, a voltage reading of approximately +.2 volt is indicative of a stored "0" while a reading of approximately +4.3 volts is indicative of a stored "1".

At $T = t_2$ the word line potential is lowered from a positive potential to a negative potential. The corresponding changes in the base potential and digit line potential are as illustrated in FIGS. 3B and 3C, respectively. It is to be noted that avalanche breakdown of the emitter-base junction of the selected transistor limits the drop of the base potential in the case of a stored "0" or a stored "1". In the case of a stored "1" the clamping effect of the forward-biased collector-base junction also limits the drop in base potential. Typically during the period from $T = t_{2+}$ to $t_{3-}$ for the case of a stored "1" the base potential reaches −2.6 volts and for the case of a "0" the base potential reaches −5.8 volts.

The combined effect of the trailing edge of the read voltage pulse which occurs at $T = t_3$ and the lowering of the digit line potential by the digit line control circuitry 24 to the reference potential causes the base potential to assume the "1" or the "0" level. If the base potential was originally at the "1" level (at $T = t_{1-}$), it returns to that level; correspondingly, if it was at the "0" level, it returns to the "0" level. It is, therefore, apparent that the readout operation, in effect, refreshes the information stored in the selected cell and is nondestructive. It is to be noted that it it not necessary to detect the readout information from a cell in order to be able to refresh the information in the cell.

The typical parameters of the word line read-refresh voltage waveform are approximately the same as the write waveform described previously.

At the termination of a write "0" or a read "0" operation, the collector and emitter are held at approximately ground potential and the base potential is approximately −3.6 volts, the "0" potential. The collector-base and emitter-base junctions of the selected transistor are therefore reverse-biased and represent high impedance paths to the charge stored on the capacitances associated with the base which causes the potential of the base to be −3.6 volts. If these reverse-biased junctions were of infinitely high impedance, the charge stored on the base would remain there indefinitely and therefore the information stored in the cell could be read out at any later time. The impedances associated with these reverse-biased junctions, however, do not have infinitely high impedances and, therefore, charge stored on the capacitances associated with the base will leak into the reverse-biased junctions and the base potential will eventually reach the same potential as the collector and emitter − 0 volts. If a "0" stored in a cell is not somehow refreshed before the charge leaks from the base and raises the base potential to O volts, the cell will store an erroneous "1" instead of a "0", since a base potential of O volts corresponds to a "1". Stored "1s" are not destroyed unless intentionally removed from the cell.

In order to maintain the information stored in all the nonselected cells during any of the operations performed on the selected cell, the nonselected word lines are held at the reference potential and the nonselected digit lines are allowed to float in potential except that the termination of the collector waveform applied to the selected word line, at which time the nonselected digit lines are forced to assume the reference potential. The information stored in the cells coupled to the word line corresponding to the selected cell is not only maintained but is refreshed with every read or write operation performed on the selected cell. This automatic refresh operation does not require knowledge of what information is stored in these nonselected cells.

Since the read and write operations performed on a selected cell refreshes the information in all cells coupled to the word line of the selected cell, the need for an operation which just refreshes information is greatly diminished. A separate refresh cycle can be performed to refresh the information contained in the cells of a selected word line by applying the waveform of FIG. 3A to the word line and allowing the potentials of all the digit lines to float except at $T = t_3$. It is not necessary that a voltage detector be coupled to any of the digit lines in order to perform this operation.

A typical embodiment of the invention comprises a 4,096 bit memory array. $C_1$ is typically 0.3 picofarads at 2 volts reverse-biased and approximately 1.2 picofarads when the collector-base junction is forward-biased. $C_2$ is typically 0.1 picofarad and $C_3$ is typically 7 picofarads. The forward current gain of the transistor utilized is typically about 120.

The embodiments described herein are intended to be illustrative of the general embodiments of the invention. Various modifications are possible consistent with the spirit of the invention. For example, a PNP transistor can be substituted for the NPN transistor. If this substitution is made the polarities of the voltage waveforms of FIGS. 2A, 2B, 2C, 3A, 3B, and 3C are of course reversed but the magnitudes of the pulses will be approximately the same. Still further, the memory can be easily operated in a word organized fashion instead of a bit organized fashion if individual voltage detectors are coupled to each digit line.

What is claimed is:

1. Semiconductor memory apparatus comprising:

a plurality of interconnected cells which each contain two terminals;

each cell comprising a junction transistor having an uncontacted base, the potential of which floats at values which are indicative of information stored in the cell;

the emitters of first selected groups of transistors being electrically coupled together;

an individual capacitor being coupled to each of the groups of common emitters;

the collectors of second selected groups of transistors being coupled together;

a first circuit having an output signal characterized by a waveform comprising a positive polarity pulse portion and a negative polarity pulse portion;

a second circuit having an output signal comprising a positive polarity voltage pulse, the second circuit being adapted to appear as an open circuit at selected times; and the first and second circuits being coupled to a selected memory cell.

2. A method for performing a memory function using at least one uncontacted base junction transistor having a capacitor coupled to the emitter comprising the steps of:

first increasing the magnitude of the potential of the collector to a value to cause the potential of the base to rise with respect to the emitter potential such that the emitter base junction is forward biased, and thereby clamps the base potential, then decreasing the magnitude of the collector potential to a value to cause the base potential to decrease with respect to the emitter potential such that the emitter base junction limits any further decrease in the base potential with respect to the emitter potential by acting in avalanche breakdown, and then increasing for the second time the magnitude of the collector potential by an amount less than the magnitude of the previous decrease, all while holding the emitter potential relatively constant, whereby the potential of the base is set to a first value;

first increasing the magnitude of the potential of the collector to a value to cause the potential of the base to rise with respect to the potential of the emitter such that the emitter base junction is forward biased and thereby clamps the base potential, then decreasing the magnitude of the potential of the collector to cause the base potential to decrease with respect to the emitter potential such that the emitter base junction limits any decrease in base potential with respect to emitter potential by acting in avalanche breakdown, and then increasing for the second time the magnitude of the potential of the collector by an amount less than the magnitude of the previous decrease in collector potential, and holding the emitter potential relatively constant during the first increasing and the decreasing of the collector potential and then no later than concurrently with the decrease in collector potential, increasing the emitter potential, whereby the potential of the base is set to a second value;

first increasing the magnitude of the potential of the collector to a value to cause the potential of the base to rise with respect to the potential of the emitter such that the emitter base junction is forward biased, then decreasing the magnitude of the potential of the collector to a point to cause the base potential to decrease and then for the second time increasing the magnitude of the collector potential by an amount less than the magnitude of the previous decrease in collector potential, all while allowing the emitter to electrically float except during the second increase in the potential of the collector, at which time the emitter potential is adjusted to a reference potential, thereby causing the readout and refreshing of information stored in the transistor.

3. Semiconductor memory apparatus comprising:

a plurality of interconnected cells, each of which contains first and second cell terminals;

each cell comprising a junction transistor having an uncontacted base, the potential of which during operation floats at values which are indicative of information stored in the cell;

the emitters of first selected groups of transistors being coupled together;

an individual capacitor being coupled to each of the groups of common emitters;

the collectors of second selected groups of transistors being coupled together;

write-in first means including means coupled to a selected cell for first increasing, then decreasing and then again increasing the magnitude of the potential of the collector while the potential of the emitter is held relatively constant, whereby the potential of the base is set to a first value, and write-in second means coupled to a selected cell for first increasing then decreasing and then again increasing the magnitude of the potential of the collector and increasing the potential of the emitter no later than concurrently with the decrease in the collector potential, whereby the potential of the base is set to a second value; and readout and regeneration third means coupled to a selected cell for first increasing then decreasing and then again increasing the magnitude of the potential of the collector and allowing the potential of the emitter to float except during the final increase in collector potential at which time the emitter potential is set to a reference potential thereby causing the nondestructive readout and refreshing of information stored in the selected cell.

4. The apparatus of claim 3 wherein the first cell terminal is coupled to the emitter and the second cell terminal is coupled to the collector.

5. The apparatus of claim 4 wherein the junction transistor is an NPN-type transistor.

6. The apparatus of claim 4 wherein the junction transistor is a PNP-type transistor.

7. The apparatus of claim 4 further comprising fourth means for detecting the information stored in a selected cell.

8. The apparatus of claim 7 further comprising means for decreasing the potential of the emitter during the second increase in the collector potential.

9. The apparatus of claim 8 wherein the first, second and third means comprise voltage pulse generator circuits and the fourth means comprises at least one voltage detector.

* * * * *